(12) United States Patent
White et al.

(10) Patent No.: US 6,677,532 B2
(45) Date of Patent: Jan. 13, 2004

(54) ISOLATED PHASE BUS DUCT JOINT ASSEMBLY

(75) Inventors: Michael Walter White, Peterborough (CA); Bruce William Mills, Peterborough (CA); Robert Henry Rehder, Peterborough (CA)

(73) Assignee: General Electric Canada Inc., Mississauga (CA)

( * ) Notice: Subject to any disclaimer, the term of this patent is extended or adjusted under 35 U.S.C. 154(b) by 0 days.

(21) Appl. No.: 10/366,473

(22) Filed: Feb. 14, 2003

(65) Prior Publication Data

US 2003/0178214 A1 Sep. 25, 2003

(30) Foreign Application Priority Data

Mar. 21, 2002 (CA) .............................................. 2377853

(51) Int. Cl.[7] ................................................. H02G 5/06
(52) U.S. Cl. ................ 174/99 B; 174/72 B; 174/133 B; 174/86 B; 439/213
(58) Field of Search ................................. 174/70 B, 88, 174/71 B, 86 B, 68.2, 72 B, 133 B; 439/213, 359

(56) References Cited

U.S. PATENT DOCUMENTS

| 2,783,299 A | | 2/1957 | Schymik |
| 2,784,012 A | | 3/1957 | Killian et al. |
| 3,459,872 A | | 8/1969 | Weimer et al. |
| 3,584,137 A | * | 6/1971 | Weimer ...................... 174/68.3 |
| 3,636,237 A | * | 1/1972 | Hafer ......................... 174/68.3 |
| 3,692,923 A | | 9/1972 | Kerti |
| 4,029,379 A | | 6/1977 | Kotala et al. |
| 4,174,143 A | | 11/1979 | Hicks, Jr. et al. |
| 4,204,085 A | | 5/1980 | Chapman et al. |
| 4,804,804 A | * | 2/1989 | Hibbert et al. ............. 174/16.2 |
| 5,821,464 A | * | 10/1998 | Graham et al. ................ 174/86 |
| 6,435,888 B1 | * | 8/2002 | Reed, Jr. ..................... 439/213 |

* cited by examiner

*Primary Examiner*—Dhiru R Patel

(57) ABSTRACT

An isolated phase bus duct joint assembly couples together first and second phase bus duct sections where each section has an interior bus conductor surrounded by an outer housing. The joint assembly couples end portions of the interior bus conductor and has first and second conductor coupling portions each extending from the end portion of one of the interior bus conductors. Each coupling portion has a reduced outside dimension relative to the interior bus conductors. The joint assembly has a plurality of movable electrical contact fingers mounted by spring loaded adjustment fasteners around the outside surface of the first conductor coupling portion. Each of the fingers extends beyond the first conductor coupling portion for engagement with the outside surface of the second conductor coupling portion. The spring loaded adjustment fastener has a threaded stem passing through the finger and the first inner conductor coupling portion. The stem has an adjustable head engaging an outer surface of the finger and a compression spring mounted over the stem to engage the inside surface of the first inner conductor coupling portion. The heads and stems are adjusted relative the compression spring to urge the fingers into locking engagement with the first and second coupling portions. This advantageously results in no substantial increase in electrical clearance required between the inner bus conductorŝ and the outer housing. Further, the heads may be backed off to provide for de-coupling or separation of the joint.

13 Claims, 4 Drawing Sheets

ISOLATED PHASE BUS DUCT JOINT ASSEMBLY

FIELD OF THE INVENTION

The present invention relates to isolated phase bus assemblies and more particularly to a novel separable plug joint assembly for coupling or plugging together isolated phase bus housing sections.

BACKGROUND OF THE INVENTION

Isolated phase bus systems are well known in the art of power transmission and distribution. Isolated phase bus systems typically comprise a plurality of isolated phase bus sections electrically connected end-to-end. Each section is provided with a central or interior conductor operated at an elevated voltage level and a conductive metal outer housing surrounding and concentric with the interior conductor, which outer housing is normally maintained at or near ground potential. The end-to-end sections in conventional isolated phase bus runs are normally coupled together and sealed by housing covers which are welded to the adjacent housings in the field.

While most runs of isolated phase bus duct systems occur in relatively open environments where it is easy to field install the housings and couplings, this is not the case in closed environments where there is restricted access to the bus duct to couple sections together in the field. Further, any coupling of the bus duct sections by housing covers that increase the diameter of the housing structure provides either a field accessibility problem or results in the enclosure having to be enlarged to house the bus duct runs.

For example, the use of bus duct runs through the shaft of a rotary transformer is contemplated to carry collector current to the rotor of the transformer. The diameter of the shaft is related to the placement of the bus duct runs in the shaft and the outside diameter of these bus duct runs because minimal distances are required between the shaft and the bus duct runs to prevent arcing and shaft heating from magnetic effects of currents carried by the bus duct runs. In this enclosed environment, it is advantageous to maintain the shaft diameter to a minimum. In this example, 3 phase isolated bus duct runs pass through the center of the shaft and the shaft is split into sections for field servicing. The bus duct runs are also split into two sections and must be coupled together within the shaft sections. Accordingly, any coupling that increases the over all diameter of the bus runs may result in restricted access to the coupling within the shaft or an increase in the shaft diameter to accommodate the 3 phase isolated bus duct runs.

While many forms of bus duct run connectors have been developed, many of these connections involve plug or stab connections or fingers with exterior mounted springs and bolts connections between the interior conductors. These connections are usually unshielded and have a larger diameter than the diameter of the interior conductors. Consequently, the outer housing coupling diameter must be increased to maintain acceptable distances between the inner conductor coupling and the outer conductive housing. In environments where there is an enclosure around the bus duct, any increase in the outer dimension of the inner conductor coupling reduces the electrical clearances to the enclosure and the enclosure has to be made larger to distance the interior wall further from the bus duct outer housing wall.

SUMMARY OF THE INVENTION

The present invention relates to an isolated phase bus duct coupling suitable for use in enclosed environments.

The present invention relates to an isolated phase bus duct coupling that is separable and readily serviceable.

The present invention further relates to isolated phase bus duct couplings suitable having minimal increased outside diameters at the coupling for the inner conductors.

The present invention relates to an isolated phase bus duct joint assembly for coupling together first and second phase bus duct sections. Each section comprises an interior bus conductor surrounded by an outer housing. The joint assembly couples end portions of the interior bus conductor by the use of spring loaded fingers that extend between the end portions of the interior bus conductors. The fingers are electrical contact members mounted to a coupling end portion of one of the interior bus conductors and the spring biases the fingers into contact with both end portions of the interior bus conductors. The springs are positioned within the inner bus conductors so as not to increase the outside diameter or dimension of the interior bus conductors at the coupling assembly. Preferably, the coupling end portions of interior bus conductors are of a reduced outside dimension so that mounting of the finger contact members to the outside surface of the coupling end portions minimizes any increase in outer dimension of the interior bus conductor at the coupling assembly. This advantageously results in no substantial increase in electrical clearance required between the inner bus conductors and the outer housing.

In an aspect of the present invention there is provided an isolated phase bus duct joint assembly for coupling together first and second phase bus duct sections. Each section comprises an interior bus conductor surrounded by an outer housing. The joint assembly comprises first and second conductor coupling portions each extending from the end portion of one of the interior bus conductors. Each of the coupling portions has inside and outside surfaces. The joint assembly comprises a plurality of movable contact fingers mounted around the outside surface of the first conductor coupling portion, each by spring loaded adjustment fasteners. Each of the fingers extends beyond the first conductor coupling portion for engagement with the outside surface of the second conductor coupling portion. Each of the spring loaded adjustment fasteners comprises a threaded stem passing through the finger and the first inner conductor coupling portion. The stem has an adjustable head engaging an outer surface of the finger and a spring, preferably compression, mounted over the stem to engage the inside surface of the first inner conductor coupling portion. The head and stem are adjusted relative to the spring to urge the finger into locking engagement with the first and second coupling portions.

Preferably, the outside surface of the first and second inner conductor coupling portions has an outside dimension reduced relative to conductor outside surfaces of the interior bus conductors. Further, the interior bus conductors of each section and the first and second inner conductor coupling portions are cylindrical in shape and the first and second inner conductor coupling portions each have a diameter reduced relative that of the interior bus conductors.

Preferably, the first and second conductor coupling are mounted within the end portion of one of the interior bus conductors and are of complementary shape with the interior bus conductors.

The coupling assembly preferably further includes a sheath attached to one of the inner conductors and extending over and spaced from fingers over the other inner conductor by a predetermined amount. The sheath has a reduced diameter forming an annular flange that fits onto the one said inner conductor. The sheath is held relative to the one inner conductor by a bead of sealant between the annular flange and one inner conductor.

The outer housing of the bus duct sections may be joined in any suitable manner. The joint may be aligned with the coupling or preferably slightly axially displaced relative to the coupling of the interior bus conductors. Preferably, the joint outer housings are joined by abutting flanges coupled by fasteners. Further an insulator is located between these flanges and the insulator extends towards the interior bus conductors to surround and support the sheath.

It should be understood that the teaching of the present invention are equally applicable to couplings that are curved or spherical in shape to have the joints located at a corner in the bus duct run. The preferred application is for two runs of bus duct extending along the same axis or closely adjacent parallel axes.

BRIEF DESCRIPTION OF THE DRAWINGS

For a better understanding of the nature and objects of the present invention reference may be had to the accompanying diagrammatic drawings in which:

BRIEF DESCRIPTION OF THE DRAWINGS

Figure 1:
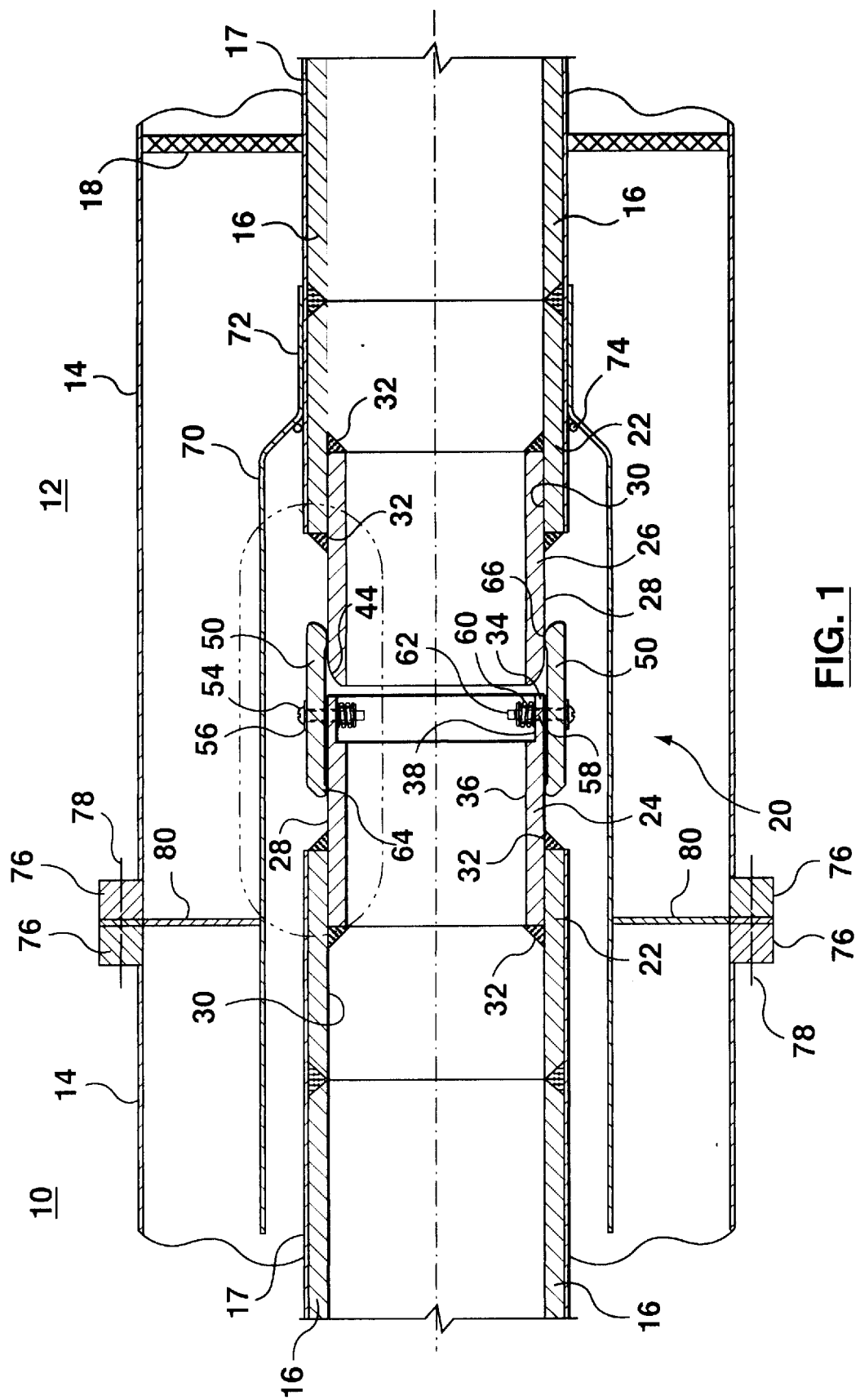

FIG. 1 is a side sectional view an isolated phase bus duct joint assembly for coupling together first and second phase bus duct sections according to an embodiment of the invention.

Figure 2:
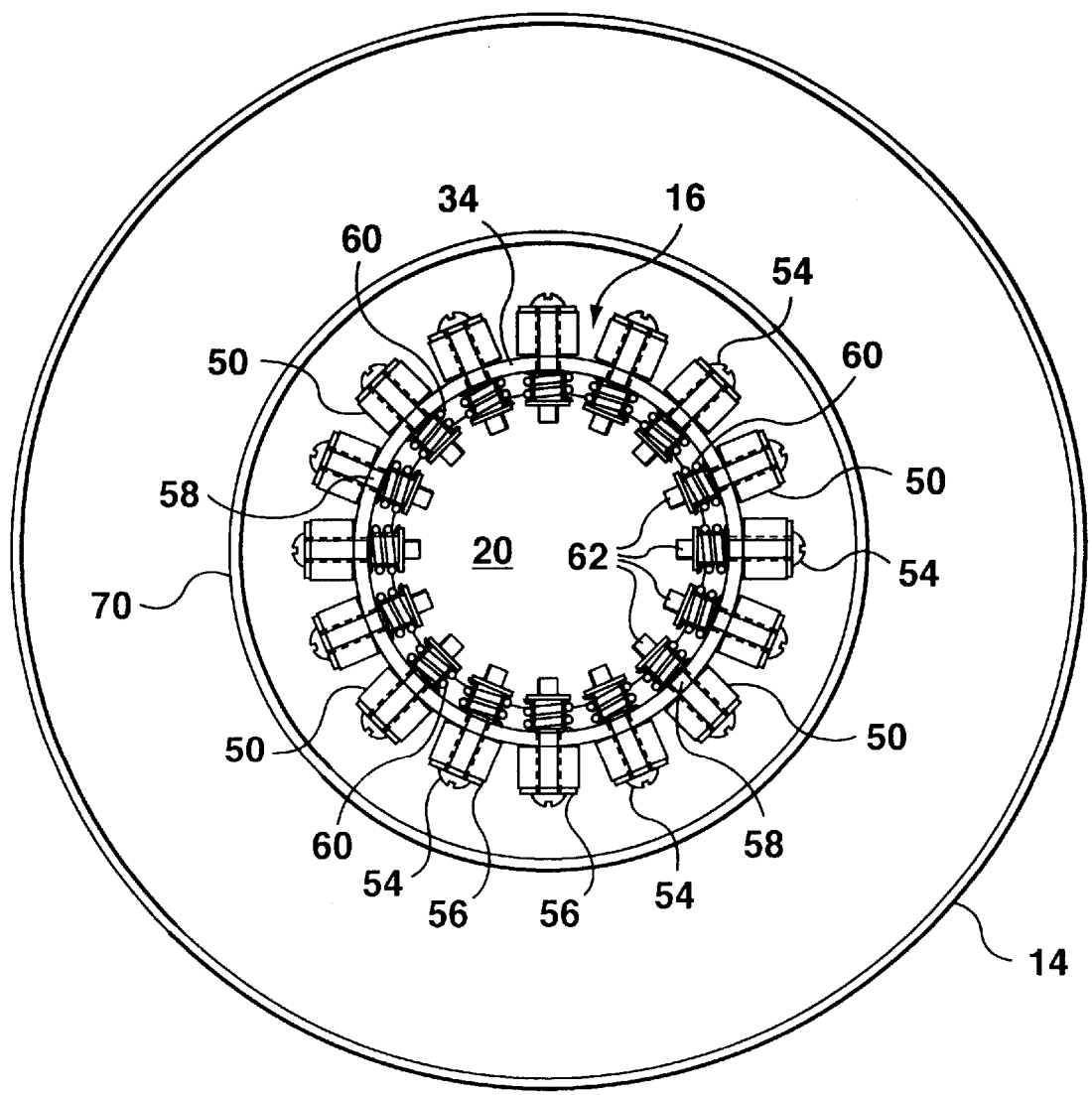

FIG. 2 is an end view of the isolated phase bus duct joint assembly of FIG. 1.

Figure 3:
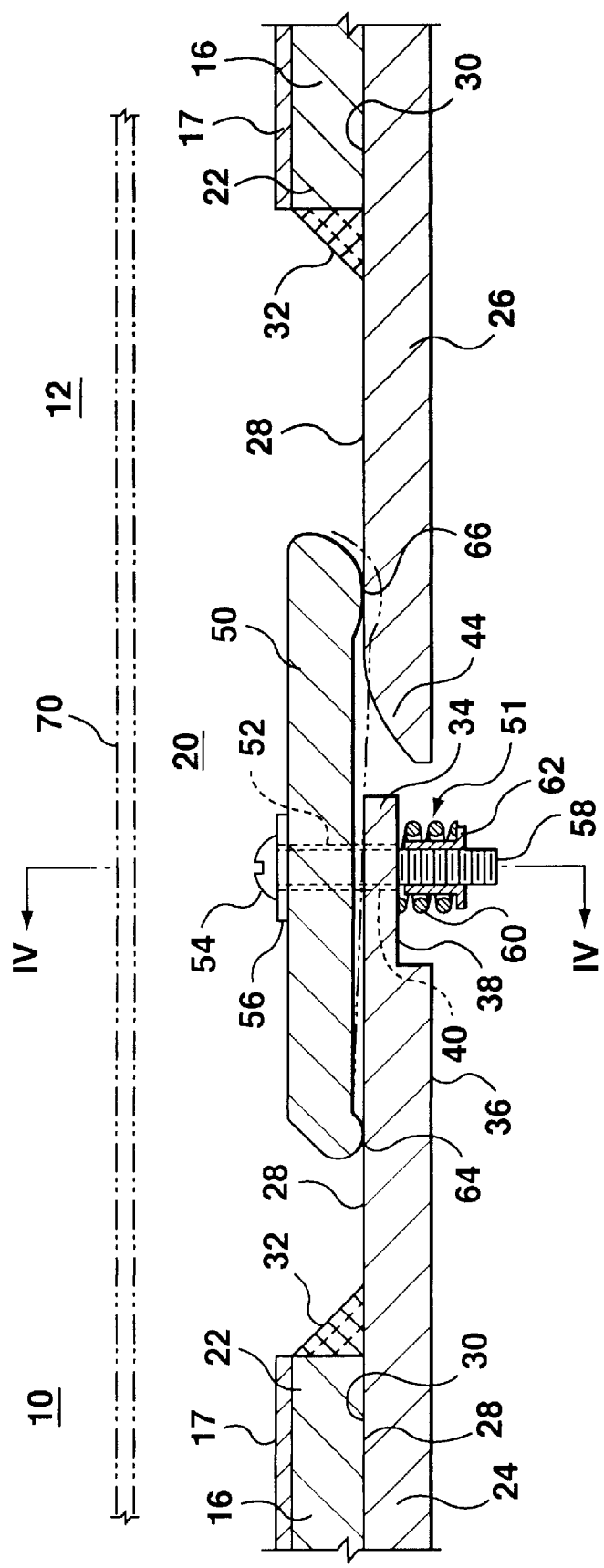

FIG. 3 is an enlarged sectional view of the isolated phase bus duct joint assembly of FIG. 1.

Figure 4:
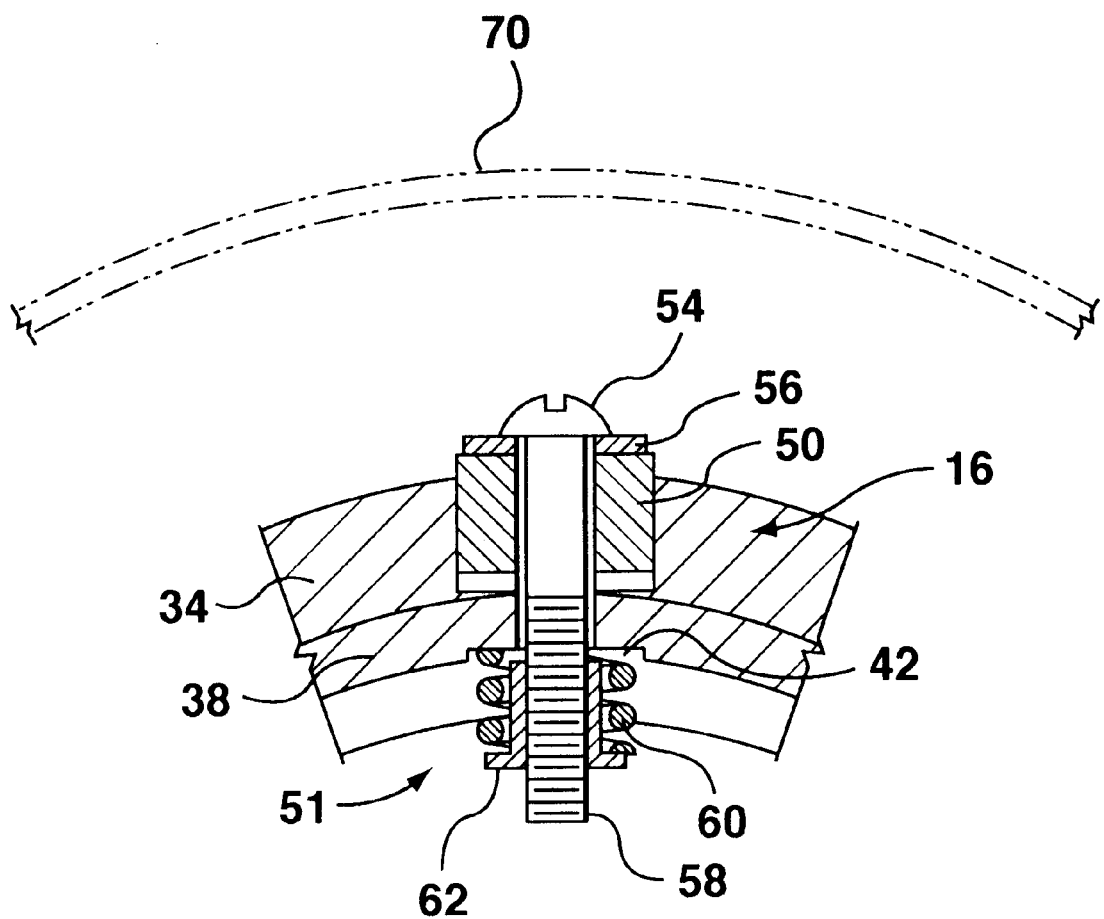

FIG. 4 is a sectional view taken at section IV—IV of FIG. 3 showing a portion of the isolated phase bus duct joint assembly.

DETAILED DESCRIPTION OF THE INVENTION

Referring to FIG. 1 there is shown two sections of bus duct generally at 10 and 12. Each section of bus duct 10, 12 comprises an outer bus duct or electrically conductive metal outer housing 14 having a tubular shape and made from aluminum. The outer metal housing may also be referred throughout the specification as an enclosure. The bus duct runs 10, 12 further include an interior or central bus conductor 16 of tubular shape made of aluminum. It should be understood that the shape of this interior bus conductor 16 may have other shapes such as a square or rectangular shape. Each of the bus conductors 16 is surrounded by a thin sleeve of insulation 17. It should be understood that the use of insulation 17 is not necessary and functions to reduce the electrical space clearance between the inner bus conductors 16 and the conductive metal outer housing 14. The interior or central bus conductor 16 in each of bus ways 10 and 12 is mounted concentrically with respect to the outer housing 14 by means of spaced insulators 18 which are spaced along the bus way runs and may completely enclose in a cylindrical ring fashion the interior bus conductor 16 spacing the interior bus conductor 16 from the exterior housing 14.

Referring FIG. 1 the bus joint assembly 20 comprises, the interior or central bus conductor 16 having end portions 22 to which first and second extension couplings or conductor coupling portions 24 and 26 are mounted. These conductor coupling portions 24 and 26 are tubular in shape and extend a predetermined distance into the inside of the tubular bus conductors 16. The extensions 24, 26 have an outside surface 28 whose diameter fits within the inside surface 30 of the interior bus conductors 16. The conductor coupling portions 24, 26 are held in place by weld type joints shown at 32. The conductor coupling portions 24, 26 have an outside surface 28 that is preferably plated with silver for better electrical conduction.

Referring to FIGS. 1 and 3, first conductor coupling portion 24 has an apron flange 34 such that the inside surface 36 of coupling portion 24 has a recessed ledge 38. The apron flange 34 has a plurality of apertures 40 (FIG. 3) spaced around the flange. As best seen in FIG. 4, each aperture 40 has a recessed spot face 42 on the recessed ledge 38. The second conductor coupling portion 26 has a curved lead-in surface 44.

The joint coupling assembly 20 in addition to conductor coupling portions 24 and 26 comprises a plurality of electrically conductive contact fingers 50 mounted to the outside surface 28 of apron flange 34 of the first coupling portion 24. Fingers 50 are preferably coated with silver to improve electrical conduction. Referring to FIG. 3, each finger 50 is provided with it's own central aperture 52 which aligns with the corresponding aperture 40 in the apron flange 34 through which round head screw 54 radially passes and is mounted on a regular washer 56.

Referring to FIGS. 3 and 4, the round head screw 54 and flat washer 56 form part of the spring loaded adjustment fasteners 51 that co-operate with apron flange 34 and each of the fingers 50 to mount fingers 50 to the outside surface 28 of the apron flange 34. The fasteners 51 further include stems 58, springs 60, and nuts 62. The threaded round head screw 54 has a threaded stem 58 on which is mounted at the spot face 42 a helical spring 60 and a nut 62. The round head screw 54 may be turned to bring the nut 62 into engagement with the spring 60 to compress spring 60 and urge finger 50 down against outside surfaces 28 of the first and second coupling portions 24, 26.

As best seen in FIG. 3, the fingers 50 further include boss like flanges 64 and 66. These flanges 64, 66 are offset relative to each other to provide for some canting of the stem 58 and screw head 54 so that as springs 60 are compressed, finger flanges 64, 66 bite into the outside surfaces 28 of the coupling portions 24, 26. It should be understood that as the finger flanges bite into the outside surfaces 28 of the coupling portions 24, 26, a good electrical contact is achieved between coupling portions 24, 26 across fingers 50. Further, the silver oxide of the silver plated fingers 50 and silver plated outside surfaces 28 of the coupling portions 24, 26 do not gall during the engagement because the silver flows to maintain a good electrical contact. The rounded flange 66 on fingers 50 and the curved lead-in edge 44 on coupling portion 26 allows for the fingers 50 to be pushed into engagement with the coupling portion 26 prior to the tightening of the round head screws 54 to lock the fingers 50 in place and hold the two interior bus conductors 16 substantially in alignment with each other. It should be understood that the shape of the fingers 50 shown herein are elongated so that fingers 50 bridge a space or gap between coupling portions 24, 26. However, if the shapes of the fingers 50 are curved, this would permit for a corner joint.

As best seen in FIG. 1, the coupling assembly 20 further includes a sheath 70. Sheath 70 is a cylindrical shaped sheath which is adapted to slide over the coupling assembly 20. The cylindrical sheath 70 has a reduced cylindrical surface 72 which is adapted to engage the outer surface 22 of one of the interior bus conductors 16. This sheath 70 extends in spaced apart relation over the coupling assembly 20 and passes over the other interior bus conductor 16 by a predetermined distance. Sheath 70 is held in place relative to the first bus conductor 16 by means of a bead of RTV silicone 74.

The exterior enclosures or outer metal housing 14 are each provided with flanges 76 having apertures (not shown) through which insulated guide pins or fasteners 78 extend to fasten outer housings 14 together. Passing between each of the flanges is an insulation ring 80 that is held in place by the insulative guide pins 78.

In the joint assembly 20, fingers 50 are shown to extend substantially in a radial direction from the center of the interior bus conductors 16 at a radial displacement substantially equal to the outside surface 22 of the bus conductor 16. Only the screw heads 54 are shown to extend slightly radially beyond surface 22. Consequently, the distance between the fingers 50 and the outside enclosure 14 does not warrant having to increase the diameter of the outside enclosure 14 for electrical clearance purposes. This is primarily accomplished by the fact that the springs 60 are located inside on the inside surface 36 of the first conductor coupling portion 24.

Further, the use of the non-metallic shield or sheath 70 that overlies the fingers 50, shields the coupling joint from the outer enclosure 14 and as a consequence, the distance between the outside enclosure 14 and the coupling joint fingers 50 is maintained at a relative minimum electrical clearance distance.

It should be understood that the bus duct sections 10, 12 shown in the drawings are for one phase of an isolated phase bus duct run and that in many instances 3 phases of bus duct run usually extend parallel to one another.

It should be understood that alternative embodiments of the present invention may be readily apparent to a person skilled in the art in view of the above description for the preferred embodiments of this invention. Accordingly, the scope of the present invention should not be limited to the teachings of the preferred embodiments and should be limited to the scope of the claims that follow.

What is claimed is:

1. An isolated phase bus duct joint assembly for coupling together first and second phase bus duct sections, each section comprising an interior bus conductor surrounded by an outer housing, the joint assembly comprising:
    first and second conductor coupling portions each extending from the end portion of one of the interior bus conductors, each of the coupling portions having inside and outside surfaces;
    a plurality of movable contact fingers mounted around the outside surface of the first conductor coupling portion each by spring loaded adjustment fasteners, each of the fingers extending beyond the first conductor coupling portion for engagement with the outside surface of the second conductor coupling portion; and,
    each of the spring loaded adjustment fasteners comprising a threaded stem passing through the finger and the first inner conductor coupling portion, the stem having an adjustable head engaging an outer surface of the finger and a spring mounted over the stem to engage the inside surface of the first inner conductor coupling portion, the head and stem being adjusted relative to the spring to urge the finger into locking engagement with the first and second coupling portions.

2. The isolated phase bus duct joint assembly of claim 1 wherein the outside surface of the first and second inner conductor coupling portions has an outside dimension reduced relative to conductor outside surfaces of the interior bus conductors.

3. The isolated phase bus duct joint assembly of claim 1 wherein the interior bus conductors of each section and the first and second inner conductor coupling portions are cylindrical in shape, and wherein the first and second inner conductor coupling portions each have a diameter reduced relative that of the interior bus conductors.

4. The isolated phase bus duct joint assembly of claim 1 wherein each of the first and second conductor coupling portions are mounted within a respective one of the end portions of one of the interior bus conductors and are of complementary shape with the interior bus conductors.

5. The isolated phase bus duct joint assembly of claim 1 further including a non-metallic sheath attached to one of the inner conductors and extending in spaced apart relation over the fingers and the other inner conductor.

6. The isolated phase bus duct joint assembly of claim 5 wherein the sheath has a reduced diameter forming an annular flange the fits onto the one said inner conductor.

7. The isolated phase bus duct joint assembly of claim 6 wherein the sheath is held relative to the one inner conductor by a bead of sealant between the annular flange and one inner conductor.

8. The isolated phase bus duct joint assembly of claim 5 wherein the outer housing of each section are joined by abutting flanges coupled by fasteners.

9. The isolated phase bus duct joint assembly of claim 8 wherein an insulator is located between flanges of each section of the outer housing and the insulator extends towards the interior bus conductors to surround and support the sheath.

10. The isolated phase bus duct joint assembly of claim 1 wherein:
    the first conductor coupling portion has a supporting apron with the inner surface having a recessed ledge, the apron having a plurality of apertures through which the stems pass, the springs being mounted on the stems to engage the inner surface at the recessed ledge;
    the second conductor coupling portion has a rounded leading edge; and,
    the fingers have rounded biting ends that bite into the outside surfaces of the first and second conductor as the heads and stems are tightened relative to the springs whereby the first and second coupling portions are locked together.

11. The isolated phase bus duct joint assembly of claim 1 wherein the spring is a compression spring.

12. The isolated phase bus duct joint assembly of claim 1 wherein the interior bus conductor is surrounded by a sleeve of insulation.

13. The isolated phase bus duct joint assembly of claim 1 wherein the outside surfaces of the first and second conductor coupling portions and the contact fingers are coated with silver.

* * * * *